United States Patent
Alexander et al.

(10) Patent No.: US 7,804,733 B2
(45) Date of Patent: Sep. 28, 2010

(54) SYSTEM AND METHOD FOR MEMORY PHASE SHEDDING

(75) Inventors: James W. Alexander, Hillsboro, OR (US); Edward R. Stanford, Dupont, WA (US); Devadatta V. Bodas, Federal Way, WA (US); Howard David, Portland, OR (US); Son H. Lam, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 254 days.

(21) Appl. No.: 11/968,142

(22) Filed: Dec. 31, 2007

(65) Prior Publication Data

US 2009/0172442 A1    Jul. 2, 2009

(51) Int. Cl.
*G11C 7/00* (2006.01)
(52) U.S. Cl. ............... 365/226; 365/277; 365/229; 323/271; 323/285; 323/237
(58) Field of Classification Search ................. 365/226, 365/227, 229; 323/271, 285, 237; 232/271, 232/285, 237
See application file for complete search history.

(56) References Cited

U.S. PATENT DOCUMENTS

| 6,385,119 | B2 * | 5/2002 | Kobayashi et al. | 365/227 |
| 7,271,503 | B2 * | 9/2007 | Nonaka | 307/45 |
| 7,294,976 | B1 * | 11/2007 | Andric et al. | 315/291 |
| 7,548,466 | B2 * | 6/2009 | Park et al. | 365/189.09 |
| 2004/0174148 | A1 * | 9/2004 | Hiraki et al. | 323/268 |
| 2008/0238390 | A1 * | 10/2008 | Trivedi et al. | 323/283 |
| 2009/0153110 | A1 * | 6/2009 | Huang | 323/271 |

* cited by examiner

*Primary Examiner*—Connie C Yoha
(74) *Attorney, Agent, or Firm*—Grossman, Tucker, Perreault & Pfleger, PLLC

(57) ABSTRACT

Embodiments of the invention supply power to DRAM or other memory devices with a multi-phase voltage regulator. A power controller coupled to the multi-phase voltage regulator causes one or more phases of the multi-phase voltage regulator to be activated or deactivated (shed) according to predetermined criteria. Embodiments of the invention thus improve power management by providing one or more reduced power states for the memory devices. Other embodiments are described.

13 Claims, 4 Drawing Sheets

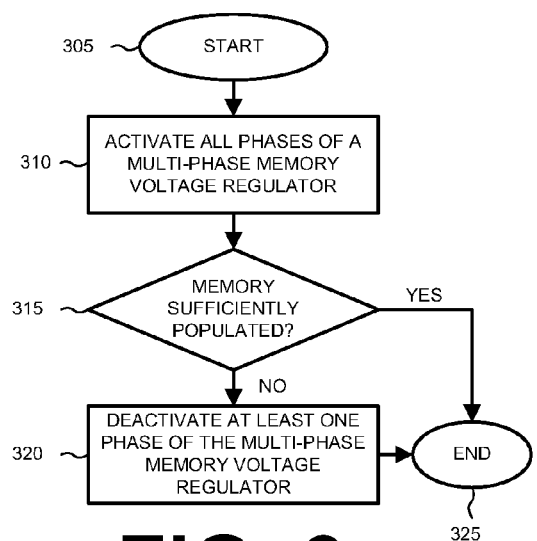
FIG. 3
| SOCKET C-STATE | PERF. CAT. | POWER | LATENCY |
|---|---|---|---|
| C0 | ACTIVE | | |
| C1/C1E | ACTIVE | | |
| C2 | IDLE | INCR PWR CONSUMPTION | INCR LATENCY |
| C3 | IDLE | | |
| ⋮ | ⋮ | | |
| CN | IDLE | | |
FIG. 4
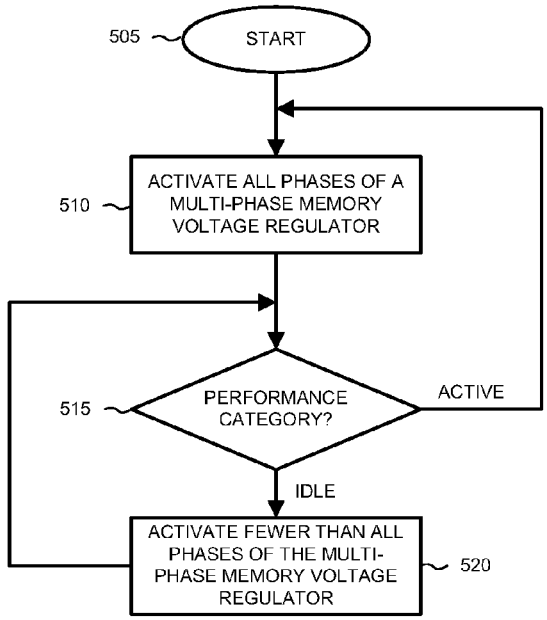
FIG. 5

SYSTEM AND METHOD FOR MEMORY PHASE SHEDDING

FIELD

The invention relates generally to power management, and more particularly, but without limitation, to systems and methods for conserving the power associated with memory devices in a computer system.

BACKGROUND

Product designers are motivated to limit power consumption in computer systems and other electronic devices. This is especially true for portable electronics, so that battery life can be extended. It is also desirable to effectively manage power consumption in desktop and enterprise-level computer systems (such as servers) to reduce heat generation and improve economic efficiencies associated with their operation.

Various sleep and hibernation modes are known for conserving power in computer systems. In such a mode, a power controller typically causes power to be removed from certain devices associated with the computer system. For example, the power controller in a portable or desktop computer may remove power from computer monitor display drivers in a sleep mode. Conventional systems may use the same type of on/off control to manage the power consumption of Dynamic Random Access Memory (DRAM) or other memory devices. For instance, in one power conservation state, the power controller may power down other devices, but leave the DRAM fully powered. In another power conservation state, the power controller may first cause DRAM content to be transferred to a hard drive; the power controller may then power down the DRAM for the remainder of the power conservation state.

Such conventional schemes have many disadvantages. For instance, where DRAM has been completely deactivated in a power conservation mode, there may be a substantial time delay upon exiting such mode to reactivate the DRAM and read data from the hard drive. Improved power conservation systems and methods are therefore needed for DRAM and other memory devices.

BRIEF DESCRIPTION OF THE DRAWINGS

The present invention will be more fully understood from the detailed description below and the accompanying drawings, wherein:

FIG. 3 is a flow diagram of a power management method, according to an embodiment of the invention;

FIG. 4 is an illustration of power management parameters, according to an embodiment of the invention;

FIG. 5 is a flow diagram of a power management method, according to an embodiment of the invention;

DETAILED DESCRIPTION

Embodiments of the invention will now be described more fully with reference to FIGS. 1 to 8, in which embodiments of the invention are shown. This invention may, however, be embodied in many different forms and should not be construed as limited to the embodiments set forth herein. Rather these embodiments are provided so that this disclosure will be thorough and complete, and will fully convey the scope of the invention to those skilled in the art.

Figure 1:
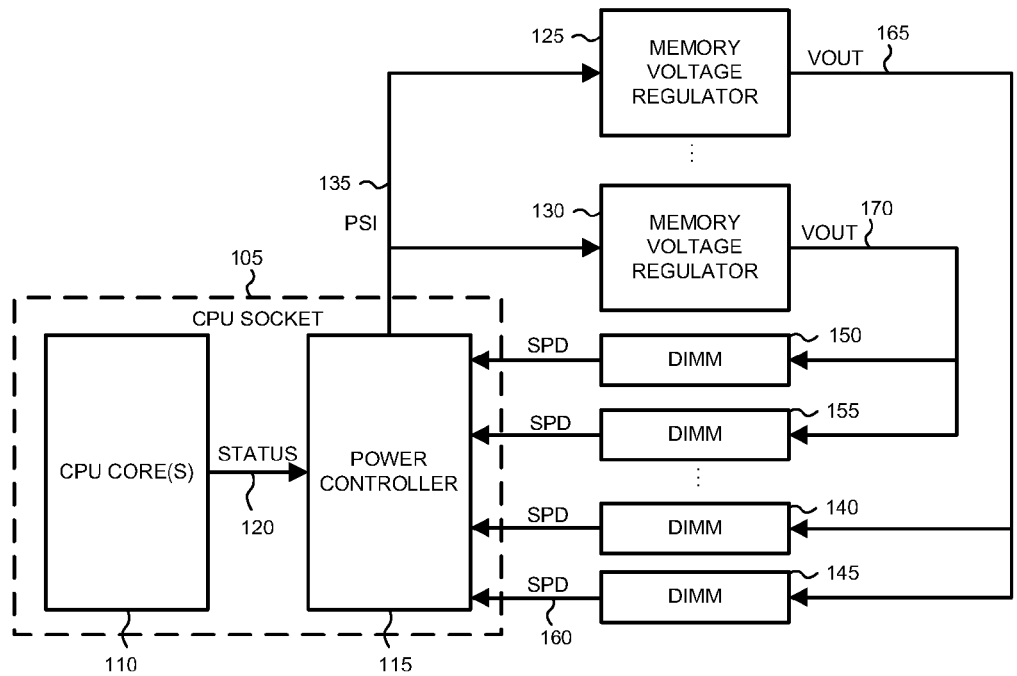
FIG. 1 is a block diagram of a computer system, according to an embodiment of the invention.

FIG. 1 is a block diagram of a computer system, according to an embodiment of the invention. The computer system includes a CPU socket 105 having at least one CPU core 110 coupled to a power controller 115. The power controller 115 may receive status messages via bus 120 from the CPU core(s) 110. The computer system also includes memory voltage regulators 125 and 130 coupled to the power controller 115 via bus 135. Bus 135 may be or include, for example, an Internal Serial Bus (ISB) or other link. The bus 135 may communicate Phase Switching (PSI) messages to the memory voltage regulator 125. The memory system further includes Dual In-line Memory Modules (DIMM's) 140 and 145 coupled to receive power from the memory voltage regulator 125, and DIMM's 150 and 155 coupled to receive power from the memory voltage regulator 130. Each of the DIMM's 140, 145, 150, and 155 may also be coupled to the power controller 115 via a bus 160. The bus 160 may be or include, for example a Serial Presence Detect (SPD) Bus. The bus 160 may communicate Serial Presence Detect (SPD) messages 160 to the power controller 115.

As used herein, SPD messages refer generally to memory information, such as presence information, and does not require compliance with the Joint Electron Device Engineering Council (JEDEC) SPD standard or any other standard. Moreover, while the SPD messages could be transmitted from the DIMM's 140, 145, 150, and 155 to the power controller 115 via a SMBus, other types of communication links could also be used.

In operation, the power control 115 receives status messages and/or SPD messages to generate PSI messages. The PSI messages are then used to control the memory voltage regulators 125 and 130. The power controller 115 may control the memory voltage regulators 125 and 130 independently. The output voltage VOUT 165 supplied by the memory voltage regulator 125 to the DIMM's 140 and 145 is controlled at a substantially constant voltage with variable current characteristics (described more fully below) that are dictated by the PSI messages. Likewise, the output voltage VOUT 170 supplied by the voltage regulator 130 to the DIMM's 150 and 155 have a substantially constant voltage and a selectable current sourcing value. Accordingly, the power controller 115 controls the power of VOUT 165 and 170 using the PSI messages that are based on the status messages and/or the SPD messages.

Variations to the architecture illustrated in FIG. 1 are possible. For example, the power controller 115 could control any number of voltage regulators. In addition, each of the voltage regulators 125 and 130 could deliver power to any number of DIMM's. The invention is not limited to the use of DIMM's; any other memory format could be used, according to design choice. An embodiment of the invention described below with reference to FIG. 3 requires SPD messages but not status messages. An embodiment of the invention described below with reference to FIG. 5 requires status messages but not SPD messages. Further, in alternative embodiments of the invention (not described elsewhere), functions described below with reference to the power controller 115 could be executed in one or more other components such as the CPU core(s) 110, the memory voltage regulators 125 and 130, and/or the DIMM's 140, 145, 150, and 155.

Figure 2:
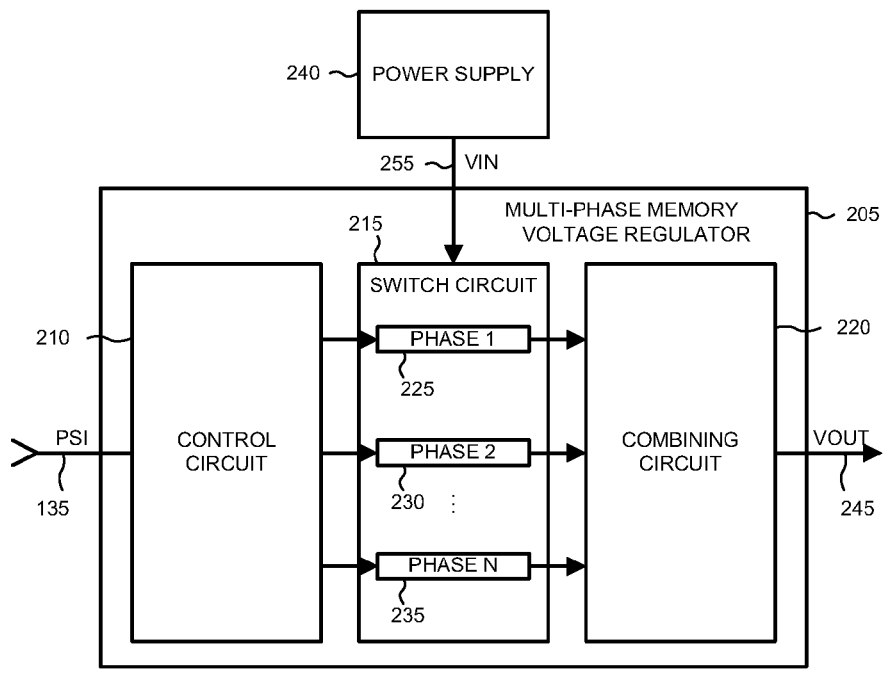
FIG. 2 is a block diagram of a multi-phase memory voltage regulator, according to an embodiment of the invention.

FIG. 2 is a block diagram of a multi-phase memory voltage regulator, according to an embodiment of the invention. The multi-phase memory voltage regulator illustrated in FIG. 2 and described below is one embodiment of the memory voltage regulators 125 and 130. The multi-phase memory voltage regulator 205 includes a control circuit 210, a switch circuit 215, and a combining circuit 220 coupled in series. The control circuit 210 may be or include, for example, a serial to parallel converter. The switch circuit 215 includes a phase 1 switch 225, a phase 2 switch 230, and a phase N switch 235. The switch circuit 215 is further configured to receive a voltage VIN 255 from a power supply 240 (not shown in FIG. 1). The combining circuit 220 may include, for instance, multiple magnetically-coupled inductors.

In operation, the control circuit 210 receives a PSI message on bus 135 from, for instance, the power controller 115. In response to the received PSI message, the control circuit 210 activates one or more of switches 225, 230, and 235 in the switching circuit 215. The switching circuit 215 thus provides one or more phases of VIN 255 to the combining circuit 220. The combining circuit 220 combines multiple phases of VIN received from the switch circuit 215 to produce the output voltage (VOUT) 245. Accordingly, the multi-phase voltage regulator 205 produces a regulated voltage VOUT 250 having a variable amount of current driving capacity (and thus power) based on the number of activated phases specified by the PSI messages.

Variations to the architecture illustrated in FIG. 2 are possible. For example, the switch circuit 215 may have any number of phase switches that are equal to or greater than two. In addition, the multi-phase memory voltage regulator 205 may further include capacitors or other discrete components, for example coupled to the output of the combining circuit 220, for signal conditioning purposes.

FIG. 3 is a flow diagram of a power management method, according to an embodiment of the invention. After beginning in step 305, the process activates all phases of a multi-phase memory voltage regulator in step 310. Then, in conditional step 315, the process determines whether memory coupled to the voltage regulator is sufficiently populated. Where the result of conditional step 315 is affirmative, the process terminates in step 325. Otherwise, the process deactivates at least one phase of the multi-phase memory voltage regulator in step 320 prior to terminating in step 325.

In order to execute step 315, the process may receive, for example, SPD messages from one or more DIMMs. As used herein, sufficiently populated means that all phases of the multi-phase memory voltage regulator are needed to fully power the installed memory in a peak demand state. Thus, where the SPD messages indicate that all or most all memory is present, step 315 may be satisfied. Otherwise, the process will deactivate at least one phase of the multi-phase memory voltage regulator in step 320. Step 320 may include deactivating (or shedding) one or more phases of the multi-phase voltage regulator.

FIG. 4 is an illustration of power management parameters, according to an embodiment of the invention. In each of four columns, the illustration of FIG. 4 compares socket C-state parameters 405, performance category 410, power parameters 415, and latency parameters 420.

The socket C-state parameters 405 represent CPU activity states, and may be included in the status message described above. The socket C-state parameters may be proprietary or may be consistent with the Advanced Configuration and Power Interface (ACPI) specification. A socket C-state of C0 may represent an execution state of the CPU socket. A socket C-state of C1/C1E may represent, for instance, a temporary halt state. A socket C-state of C2 may represent a sleep state, and a socket C-state of C3 may represent stopped activity. Performance categories 410 illustrate that each of the socket C-states 405 may be categorized, for example, into one of an active category and an idle category. In the illustrated embodiment, the socket C-states C0 and C1/C1E are categorized as active, and socket C-states of C2 and below are categorized as idle. Column 415 illustrates that power consumption increases at higher socket C-states. Column 420 illustrates that latency, or processing delay, increases at lower socket C-states.

Table 4 thus illustrates power and performance tradeoffs based on socket C-states. In embodiments of the invention, the power management construct for socket C-states is applied to the memory power management problem.

FIG. 5 is a flow diagram of a power management method, according to an embodiment of the invention. After starting in step 505, the process activates all phases of a multi-phase memory voltage regulator in step 510. Next, in step conditional step 515, the process determines a performance category (for example based on socket C-state information and a predetermined association between socket c-states and performance categories). Where the result of conditional step 515 indicates that a socket is active, the process returns to step 510. Where the result of conditional step 515 indicates that the socket is idle, the process advances to step 520 to activate fewer than all phases of the multi-phase memory voltage regulator. So long as the socket is active, all phases of the multi-phase memory voltage regulator remain activated. When the socket is idle, fewer than all phases of the multi-phase memory voltage regulator are activated.

Any number of phases may be shed in a first execution of step 520. For example, where the multi-phase memory voltage regulator has four phases, step 520 may shed one, two, or three phases, according to design choice. If the process returns to step 520 from an idle state, then no additional phases are shed.

Figure 6:
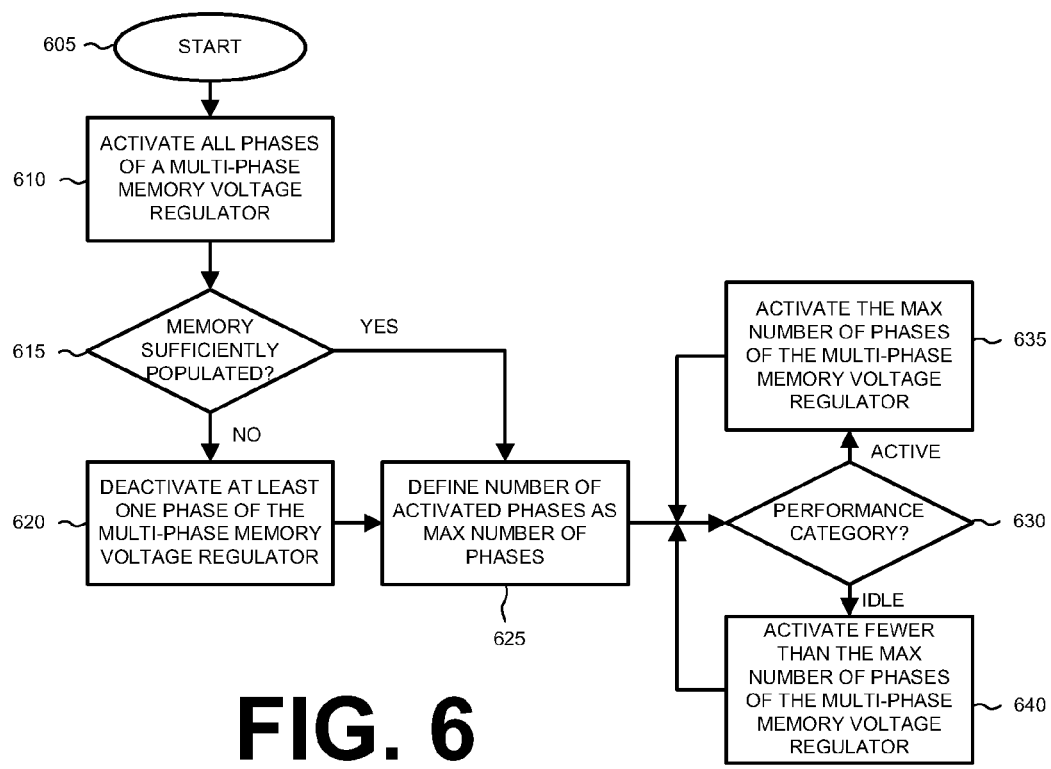
FIG. 6 is a flow diagram of a power management method, according to an embodiment of the invention.

FIG. 6 is a flow diagram of a power management method, according to an embodiment of the invention. As illustrated in FIG. 6, the process begins in step 605, and then activates all phases of a multi-phase memory voltage regulator in step 610. Next, in conditional step 615, the process determines whether the memory coupled to the multi-phase memory voltage regulator is sufficiently populated. Where the result of conditional step 615 is in the affirmative, the process defines the number of activated phases (i.e., the total number of phases) as the max number of phases in step 625. Where the result of conditional step 615 is not satisfied, the process deactivates at least one phase of the multi-phase memory voltage regulator in step 620 before defining a number of still-activated phases (i.e., less than the total number of phases) as the max number of phases in step 625.

Subsequent to step 625, the process advances to conditional step 630 to determine a performance category (for example based on a socket C-state information and a predetermined association between socket c-states and performance categories). Where the performance category is active, the process activates the max number of phases of the multi-phase memory voltage regulator in step 635. Where the result of conditional step 630 indicates that the performance category is idle, the process activates fewer than the max number of phases of the multi-phase memory voltage regulator in step 640.

Figure 7:
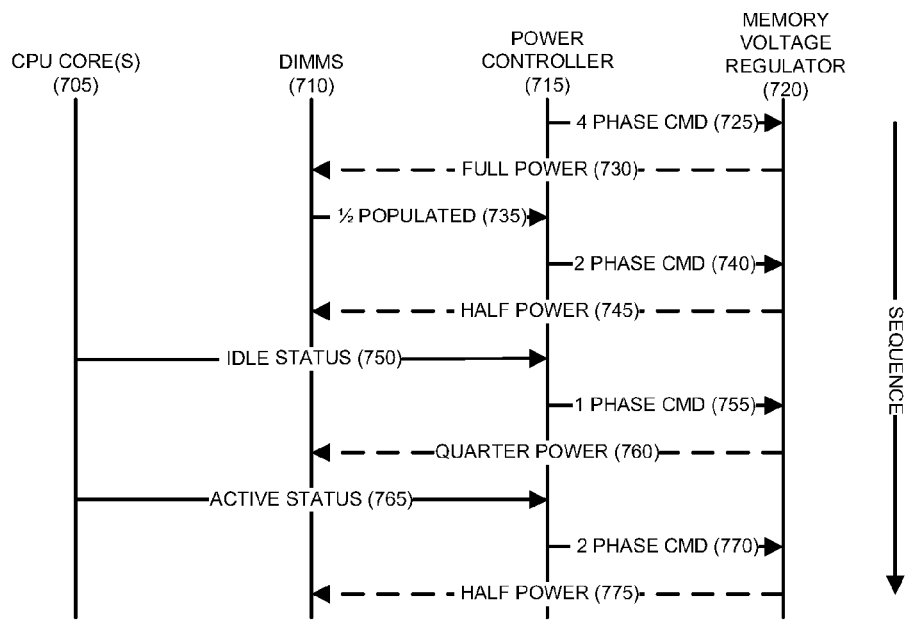
FIG. 7 is a sequence diagram of a power management method, according to an embodiment of the invention.

FIG. 7 is a sequence diagram of a power management method, according to an embodiment of the invention. FIG. 7 illustrates message and power transfer between each of four components of a computer system. As used herein, a message may be, for example, a status message or a command. In particular, the illustration of FIG. 7 indicates such communications between a CPU core(s) 705, DIMM's 710, a power controller 715, and a memory voltage regulator 720. The messages and power are sequentially activated from top to bottom.

In step 725, the power controller 715 sends a 4-phase command to the memory voltage regulator 720. In response to the 4-phase command, the memory voltage regulator 720 supplies full power to the DIMM's 710 in step 730. Next, in step 735, the DIMM's 710 supply a SPD or other message indicating 50% memory population to the power control 715. In response to the SPD message, the power controller 715 sends a 2-phase command to the memory voltage regulator 720 in step 740. In response to the 2-phase command, the memory voltage regulator 720 delivers half power to the DIMM's 710 in step 745. Next, in response to an idle status message from the CPU core(s) 705 in step 750, the power controller 715 sends a 1-phase command to the memory voltage regulator 720 in step 755. In response to the 1-phase command, the memory voltage regulator 720 supplies quarter power to the DIMM's 710 in step 760. Then, in response to an active status message received from the CPU core(s) 705, the power controller 715 initiates a 2-phase command to the memory voltage regulator 720 in step 770. In response to the 2-phase command, the memory voltage regulator 720 delivers half power to the DIMM's 710 in step 775.

The sequence of communications illustrated in FIG. 7 is exemplary only. In the illustrated embodiment, the multi-phase voltage regulator 720 included a maximum of four phases. In addition, in the illustrated embodiment, the DIMM's 710 were populated 50%. Moreover, for the illustrated embodiment, it was predetermined that an idle status should result in a single phase operation of the memory voltage regulator. The sequence diagram illustrated in FIG. 7 represents an exemplary execution of the process described above with reference to FIG. 6.

Figure 8:
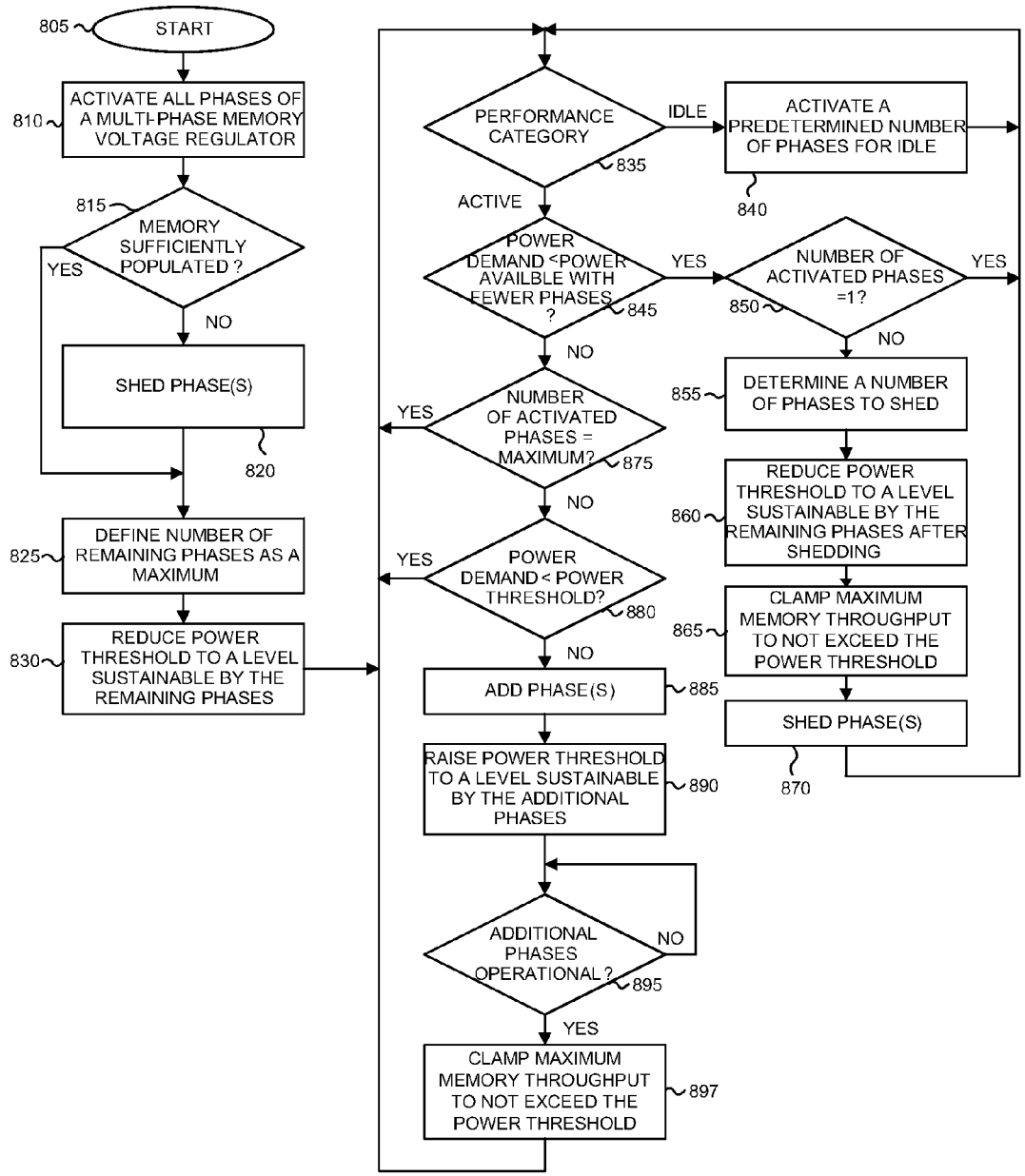
FIG. 8 is a flow diagram of a power management method, according to an embodiment of the invention.

FIG. 8 is a flow diagram of a power management method, according to an embodiment of the invention. After starting in step 805, the process activates all phases of a multi-phase memory voltage regulator in step 810. Next, in conditional step 815, the process determines whether a memory coupled to the multi-phase memory voltage regulator is sufficiently populated. Where the result of conditional step 815 is satisfied, the process advances to step 825 to define all phases as a max number of phases to be activated. Where the result of conditional step 815 is not satisfied, the process advances to step 820 to shed (deactivate) at least one phase of the multi-phase memory voltage regulator before advancing to step 825; in this instance, the max number of phases defined in step 825 is less than the total number of phases of the multi-phase memory voltage regulator.

Subsequent to step 825, the process reduces a power threshold to a level sustainable by the remaining activated phases. The process then advances to conditional step 835 to determine a performance category (for example, based on socket C-state information, as described with reference to FIG. 4). Where the result of conditional step 835 indicates an idle state, the process activates a pre-determined number of phases for the idle state in step 840.

Where the result of conditional step 835 indicates an active state, the process advances to conditional step 845 to determine whether a power demand is less than power that is available from fewer activated phases. Where the result of conditional step 845 is met, the process advances to step 850 to determine whether a number of activated phases is equal to one. Where the number of activated phases is equal to one, no additional phases can be shed for the active state, and the process returns to step 835.

Where conditional step 850 is not satisfied, the process determines a number of phases to shed in step 855, reduces the power threshold to a level sustainable by the remaining phases after shedding in step 860, and clamps a maximum memory throughput to a level that will not exceed the power threshold in step 865. In step 870, the process sheds (deactivates) the number of phases in the memory voltage regulator that were determined in step 855. After step 870, the process returns to step 835.

Where conditional step 845 is not satisfied, the process advances to conditional step 875 to determine whether the number of activated phases is equal to the maximum number of phases set in step 825. Where conditional step 875 is satisfied, no additional phases can be added, and the process returns to step 835.

Where conditional step 875 is not satisfied the process is promoted to conditional step 880 to determine whether the power demand is less than the power threshold. Where conditional step 880 is satisfied, the process returns to step 835; otherwise, the process adds (activates) at least one phase of the memory voltage regulator in step 885 and raises the power threshold to a level sustainable by all activated phases in step 890.

Next, in conditional step 895, the process determines whether the additional phases are operational. Once conditional step 895 is satisfied, the process clamps maximum memory throughput at a level that will not exceed the power threshold in step 897.

Accordingly, the process in FIG. 8 adjusts a number of activated phases in the memory voltage regulator based on the amount of memory that is installed, an active or idle state of the CPUs, and a level of power demand. By adjusting the level of memory throughput prior to adjusting the number of activated phases, the system avoids the possibility of insufficient power during memory access.

The power controller 115 may be configured to execute one or more of the processes described above with reference to FIGS. 3, 5, 6, and 8.

It will be apparent to those skilled in the art that modifications and variations can be made without deviating from the spirit or scope of the invention. For example, measures of CPU activity other than socket C-states may be used, and performance categories other than, or in addition to active and idle may be used, according to design choice. Thus, it is intended that the present invention cover any such modifications and variations of this invention provided they come within the scope of the appended claims and their equivalents.

The invention claimed is:

1. A method for power management, comprising:
    activating all phases of a multi-phase memory voltage regulator;
    determining whether to decrease power supplied to at least one memory device, wherein determining whether to decrease the power supplied to the at least one memory device includes determining the extent to which a plurality of memory sockets are populated;
    if it is determined to decrease the power supplied to the at least one memory device, deactivating at least one phase of the multi-phase memory voltage regulator
    after the deactivating, setting a number of activated phases equal to a maximum number of phases;

determining whether a central processing unit (CPU) associated with the multi-phase memory voltage regulator is in an active state or an idle state;

if the CPU is in the idle state, deactivating at least one phase of the multi-phase memory voltage regulator;

determining whether a power demand is less than a predetermined power threshold; and if the power demand is less than the predetermined threshold and the number of activated phases is greater than one, deactivating at least one phase of the multi-phase memory voltage regulator.

2. The method of claim 1, wherein the activating includes transmitting an activation message to the multi-phase memory voltage regulator.

3. The method of claim 1, wherein the deactivating includes transmitting a deactivation message to the multi-phase memory voltage regulator.

4. The method of claim 1, wherein determining the extent to which the plurality of memory sockets are populated includes receiving a Serial Presence Detect (SPD) message from the at least one memory device.

5. The method of claim 1, further comprising, if the CPU is in the active state, activating the maximum number of phases of the multi-phase memory voltage regulator.

6. The method of claim 1, wherein the determining whether the CPU associated with the multi-phase memory voltage regulator is in the active state or the idle state includes:
reading a CPU socket C-state; and
associating the CPU socket C-state with one of the active state and the idle state.

7. The method of claim 1, wherein determining whether to decrease the power supplied to the at least one memory device includes determining whether a central processing unit (CPU) associated with the multi-phase memory voltage regulator is in an active state or an idle state.

8. The method of claim 7, wherein the determining whether the central processing unit (CPU) associated with the multi-phase memory voltage regulator is in the active state or the idle state includes:
reading a CPU socket C-state; and
associating the CPU socket C-state with one of the active state and the idle state.

9. The method of claim 1, further comprising reducing the predetermined power threshold to a level sustainable by at least one remaining phase after deactivating at least one phase of the multi-phase memory voltage regulator.

10. The method of claim 9, further comprising clamping a maximum memory throughput to a level that will not exceed the predetermined power threshold.

11. The method of claim 1, further comprising:
determining whether a power demand is less than a predetermined power threshold; and
if the power demand is greater than the predetermined power threshold and the number of activated phases is less than the maximum number of phases set, activating at least one phase of the multi-phase memory voltage regulator.

12. The method of claim 11, further comprising
raising the predetermined power threshold to a level sustainable by the at least one additionally activated phase; and
determining whether the at least one additionally activated phase is operational.

13. The method of claim 12, further comprising, if the at least one additionally activated phase is operational, clamping a maximum memory throughput to a level that will not exceed the predetermined power threshold.

* * * * *